J. G. RICHERT.
REFRIGERATING CAR.
APPLICATION FILED FEB. 21, 1914.
1,137,285.
Patented Apr. 27, 1915.
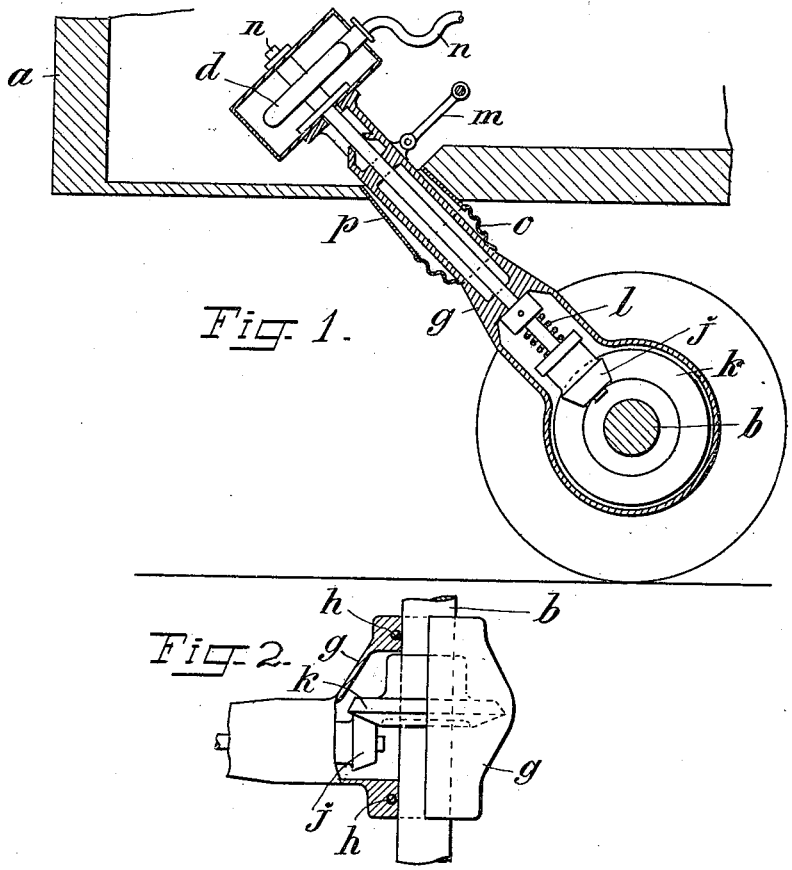

UNITED STATES PATENT OFFICE.

JOHAN GUSTAF RICHERT, OF STOCKHOLM, SWEDEN.

REFRIGERATING-CAR.

1,137,285.   Specification of Letters Patent.   Patented Apr. 27, 1915.

Application filed February 21, 1914. Serial No. 820,258.

*To all whom it may concern:*

Be it known that I, JOHAN GUSTAF RICHERT, a subject of the King of Sweden, and a citizen of Sweden, residing at 16 Norrmalmstorg, Stockholm, in the Kingdom of Sweden, have invented certain new and useful Improvements in Refrigerating-Cars, of which the following is a specification.

This invention relates to refrigerating cars of the kind in which a liquid or gaseous refrigerating medium is caused to circulate through the car by means of a pump or fan driven from one of the wheel axles. The fan or pump together with its casing is according to this invention movably arranged relatively to the car.

The invention is illustrated in the annexed drawings in which:—

Figure 1 is a vertical section, and Fig. 2 is a horizontal section.

In these drawings $a$ is the car, $b$ is the axle of one pair of wheels, $d$ is the fan or pump, the casing of which is attached to a shell $g$ inclined to the horizontal and supported at its lower end by the shaft $b$. A ball bearing $h$ is mounted between the shell $g$ and the shaft $b$ as shown in Fig. 2. A friction wheel $j$ mounted on the fan or pump shaft may be brought into or out of gear with a friction wheel $k$ mounted on the car shaft. Any other suitable transmission device may be employed if desired. A spring $l$ tends to force the wheel $j$ against the wheel $k$. In order that the pump and its casing may be movable relatively to the car $a$ the shell $g$ is pivotally mounted on the car $a$ by means of a link $m$. $n$ is the pump inlet, while flexible outlet pipes to allow for the movements of the fan or pump are provided. A sleeve or washer $o$ of leather, rubber or other flexible material is provided between the frame and a guide $p$ which projects from the car, this sleeve or washer serving to prevent the entry of dirt or moisture. The pump or fan may be driven independently of the position of the frame relatively to the car while the frame can accommodate itself to the movements of the car and wheels.

I claim:—

1. A refrigerating installation comprising a car body mounted on wheels, a fan driven from a wheel axle and mounted in said car body, said fan being rigidly supported on the truck but being with its casing movably arranged relatively to the car body.

2. A refrigerating installation comprising a car body mounted on wheels, a fan driven from a wheel axle, a driving shaft for said fan mounted between the fan and the wheel axle, a shell inclosing the driving shaft and inclined to the horizontal, said shell being supported by the car axle and indirectly supporting the fan.

3. A refrigerating installation comprising a car body mounted on wheels, a fan driven from a wheel axle, a driving shaft for said fan mounted between the fan and said wheel axle, a shell supported by the car axle and inclosing the driving shaft and inclined to the horizontal, said shell being pivotally connected to the car by a link member and supporting the fan.

4. A refrigerating installation comprising a car body mounted on wheels, a fan driven from a wheel axle and mounted in said car, a driving shaft for said fan mounted between the fan and the wheel axle, a shell inclosing the driving shaft supporting the fan and supported by the car axle and inclined to the horizontal and a sleeve of flexible material mounted between the car and the shell.

In testimony whereof I have affixed my signature in presence of two witnesses.

JOHAN GUSTAF RICHERT.

Witnesses:
 HARRY ALBIHN,
 ERICH ABRAHAMSON.

Copies of this patent may be obtained for five cents each, by addressing the "Commissioner of Patents, Washington, D. C."